(12) United States Patent
Hodges et al.

(10) Patent No.: US 9,950,805 B2
(45) Date of Patent: Apr. 24, 2018

(54) AIRCRAFT ENGINE FAN SPEED DISPLAY IMPROVEMENTS FOR ENHANCED MONITORING AND THRUST SETTING ABILITY

(71) Applicant: The Boeing Company, Chicago, IL (US)

(72) Inventors: Christopher M. Hodges, Maple Valley, WA (US); Kevin S. Brown, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/922,395

(22) Filed: Oct. 26, 2015

(65) Prior Publication Data

US 2017/0113809 A1    Apr. 27, 2017

(51) Int. Cl.
| | | |
|---|---|---|
| *B64D 43/00* | (2006.01) | |
| *F01D 21/00* | (2006.01) | |
| *G01P 1/11* | (2006.01) | |
| *G01P 3/00* | (2006.01) | |

(52) U.S. Cl.
CPC .......... *B64D 43/00* (2013.01); *F01D 21/003* (2013.01); *G01P 1/11* (2013.01); *G01P 3/00* (2013.01)

(58) Field of Classification Search
None
See application file for complete search history.

(56) References Cited

U.S. PATENT DOCUMENTS

| | | | |
|---|---|---|---|
| 5,050,081 A | 9/1991 | Abbott et al. | |
| 5,404,766 A | 4/1995 | Thomas | |
| 6,195,598 B1 * | 2/2001 | Bosqui | B64D 43/00 |
| | | | 340/963 |
| 6,262,674 B1 | 7/2001 | Wyatt | |
| 6,336,060 B1 * | 1/2002 | Shigemi | G01P 13/025 |
| | | | 244/177 |
| 7,053,796 B1 | 5/2006 | Barber | |
| 7,148,814 B2 | 12/2006 | Sikora et al. | |
| 7,412,308 B2 * | 8/2008 | Naimer | G01D 7/002 |
| | | | 701/7 |
| 7,636,617 B2 | 12/2009 | Artini et al. | |

(Continued)

FOREIGN PATENT DOCUMENTS

GB    1578535 A    11/1980

OTHER PUBLICATIONS

Extended European Search Report dated Apr. 4, 2017 in European Patent Application No. 16193251.2 (European counterpart of the instant U.S. patent Application).

*Primary Examiner* — James M McPherson

(74) *Attorney, Agent, or Firm* — Ostrager Chong Flaherty & Broitman P.C.

(57) ABSTRACT

Systems and methods for displaying N1 speed on a flight deck display in a manner that provides increased resolution at the upper end of the operating range. This is accomplished by a variable scale(s) which improves the functionality of the N1 gauge (serving as an indication of thrust) in the desired region. Also, there is visual indication to provide pilots the ability to discern if the current thrust is within a specific tolerance to the desired value within the takeoff region. This additional indication is based on color changes associated with the N1 display structure.

12 Claims, 8 Drawing Sheets

(56) References Cited

U.S. PATENT DOCUMENTS

| | | | |
|---|---|---|---|
| 2003/0222887 A1* | 12/2003 | Wilkins, Jr. | G01C 23/005 345/618 |
| 2004/0046712 A1* | 3/2004 | Naimer | G01C 23/005 345/9 |
| 2004/0113816 A1 | 6/2004 | Maris | |
| 2008/0136677 A1* | 6/2008 | Clark | B64D 43/00 340/969 |
| 2010/0302073 A1* | 12/2010 | Fernandez | G01D 7/002 340/959 |
| 2011/0001636 A1 | 1/2011 | Hedrick | |
| 2015/0120095 A1* | 4/2015 | Coulmeau | G01C 23/00 701/3 |

\* cited by examiner

AIRCRAFT ENGINE FAN SPEED DISPLAY IMPROVEMENTS FOR ENHANCED MONITORING AND THRUST SETTING ABILITY

BACKGROUND

The technology disclosed herein relates generally to systems and methods for displaying aircraft engine characteristics, such as the operational states of engines, to the flight crew of an aircraft. In particular, the technology disclosed herein relates to display systems and methods for use in indicating the thrust and fan speed of a turbofan aircraft engine.

In controlling the thrust of a turbofan engine, and especially in causing selected changes in the thrust output of such an engine, it is important that a thrust control system provide both accurate and stable indication of thrust. In addition, aircraft are required to provide tachometer indications of engine rotor speeds, including the fan speed (N1). Some commercial transport aircraft with turbofan engines utilize N1 itself as the thrust setting parameter. Providing acceptable accuracy and stability in the display of N1, serving both as a tachometer and as the thrust setting parameter, has been a problem of long standing in the art. This is primarily because the relationship between N1 and thrust is non-linear, resulting in loss of resolution at the upper end (near maximum or takeoff thrust) of the scale. Small changes in N1 at the upper end of the range correspond to large changes in thrust (larger than the same change in N1 at the low end of the fan speed range) This can make pilot determination of a target thrust set difficult due to the low resolution of the display. As a result, a pilot may have difficulty in detecting or setting small thrust increments at high thrust.

It would be advantageous to provide a means for increasing resolution at the upper end of the N1 scale as well as other visual cues for indicating to the pilot that the engine is delivering the desired thrust.

SUMMARY

The subject matter disclosed in detail below is directed to systems and methods for displaying N1 fan speed in a manner that provides increased resolution at the upper end of the operating range. This is accomplished by a variable scale(s) which improves the functionality of the N1 gauge (as a thrust gauge) in the desired region. Also, there is visual indication to provide pilots the ability to discern if the current thrust is within a specific tolerance to the desired value within the takeoff region. This additional indication is achieved by color changes associated with the N1 display structure.

The display disclosed in detail below provides increased performance of the N1 display parameter and can support a reduction in the number of required engine displays on the flight deck (e.g., N1 only instead of N1 and a different dedicated thrust setting parameter such as engine pressure ratio (EPR)). The display disclosed herein can also increase the ability of the pilot to determine what the thrust setting is.

One aspect of the subject matter disclosed in detail below is a computer-implemented method for displaying aircraft engine information, comprising: acquiring a value of an engine control parameter during operation of an aircraft engine, wherein the engine control parameter has a nonlinear relationship with thrust; displaying on a display unit symbology representing the engine control parameter at positions relative to the scale using a nonlinear scaling function. In the disclosed embodiments, the engine control parameter is fan speed (N1). The nonlinear scaling function may be an algebraic function (e.g., a polynomial) or a lookup table, providing the desired symbology positions on the scale corresponding to each possible value of fan speed. In the disclosed embodiments, the scale is a circular arc and the symbology is a radial line originating at a center of and intersecting the circular arc at an angular position. The method may further comprise displaying a discrete cue that thrust has been set to a takeoff thrust value that is within a specified tolerance of a desired takeoff thrust value.

Another aspect of the subject matter disclosed in detail below is a system for indicating aircraft engine information onboard an aircraft, comprising: a display unit that can be controlled electronically to generate symbology and colors; and a display control processor configured to control the display unit to generate indicators indicating the current fan speed of an operating aircraft engine, wherein the display control processor is configured to perform the following operations: acquiring a value of an engine control parameter during operation of an engine, wherein the engine control parameter has a nonlinear relationship with thrust; controlling the display unit to display a scale; and controlling the display unit to display symbology having a position relative to the scale using a nonlinear scaling function, the symbology representing the acquired value of the engine control parameter. In the disclosed embodiments, the engine control parameter is fan speed. The nonlinear scaling function may be a polynomial function. The system may further comprise computer memory having a look-up table stored therein, wherein the lookup table comprises fan speed values and corresponding symbology positions of the symbology relative to the scale, and the display control processor may be further configured to retrieve the position of the symbology relative to the scale from the lookup table. In the disclosed embodiments, the scale is a circular arc and the symbology is a radial line originating at a center of and intersecting the circular arc at an angular position. The display control processor may be further configured to control the display unit to display a discrete cue that thrust has been set to a takeoff thrust value that is within a specified tolerance of a desired takeoff thrust value.

A further aspect of the subject matter disclosed in detail below is an aircraft comprising: an aircraft engine having a fan; a sensor configured to generate fan speed data representing a measurement of a fan speed of the fan; a display unit that can be controlled electronically to generate symbology and colors; and a display control processor configured to perform the following operations: receiving fan speed data generated by the sensor; and controlling the display unit to display a scale and symbology having a position relative to the scale determined using a nonlinear scaling function, the symbology representing the measured fan speed. The display control processor may be further configured to control the display unit to display a discrete cue that thrust has been set to a takeoff thrust value that is within a specified tolerance of a desired takeoff thrust value.

Other aspects of N1 display gauges suitable for use as thrust indicators are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of systems and methods for displaying aircraft engine parameters during engine operation are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1A:
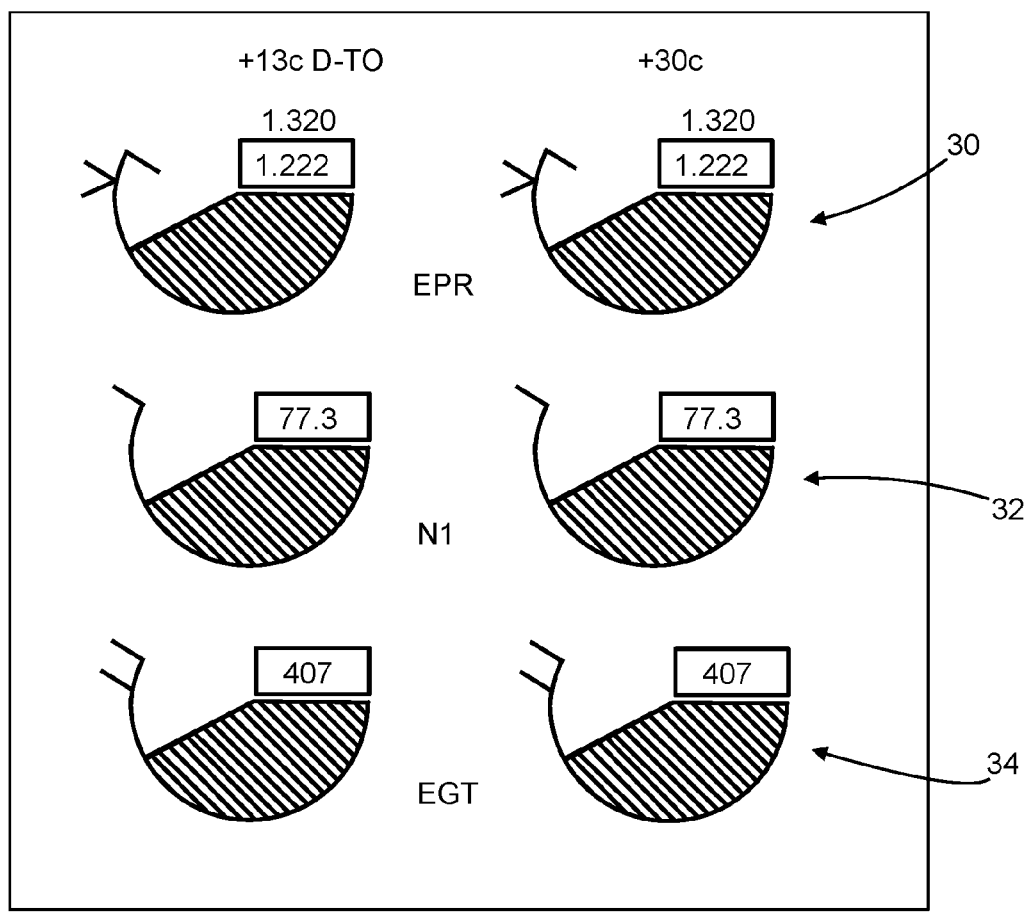
FIG. 1A is a diagram representing one type of primary engine display for a flight deck that includes a dedicated thrust setting parameter (EPR) separate from the N1 tachometer dial.
Figure 1B:
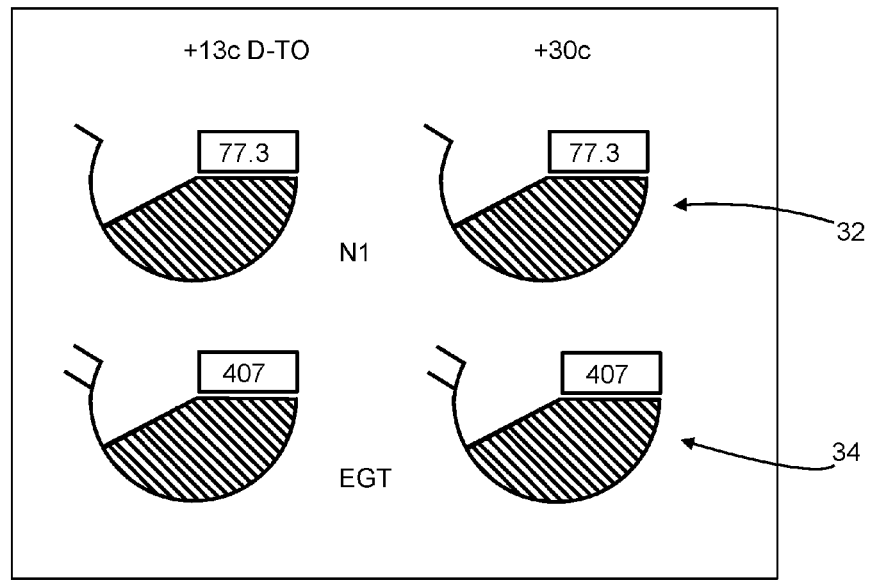
FIG. 1B is a diagram representing another type of primary engine display for a flight deck that does not include EPR and uses N1 for both tachometer and for thrust setting.

Modern aircraft engine flight deck displays typically include computer-driven display screens dedicated to presenting engine status information. These display screens typically present to the pilots engine data indicating the values of a variety of engine operating parameters. For example, it is known to provide a primary engine display that presents top-level engine parameter data. FIG. 1A shows a primary engine display comprising an engine pressure ratio (EPR) display 30, an N1 speed display 32, and an exhaust gas temperature (EGT) display 34. In this display, EPR is the thrust setting parameter and N1 is the tachometer for fan speed. The primary engine display can include multiple sets of displays (two are shown in FIG. 1A), one set for each engine of the aircraft. FIG. 1B shows a primary engine display comprising an N1 speed display and an exhaust gas temperature (EGT) display. In this display, N1 serves both as the tachometer for fan speed and as the primary thrust setting parameter.

Figure 2:
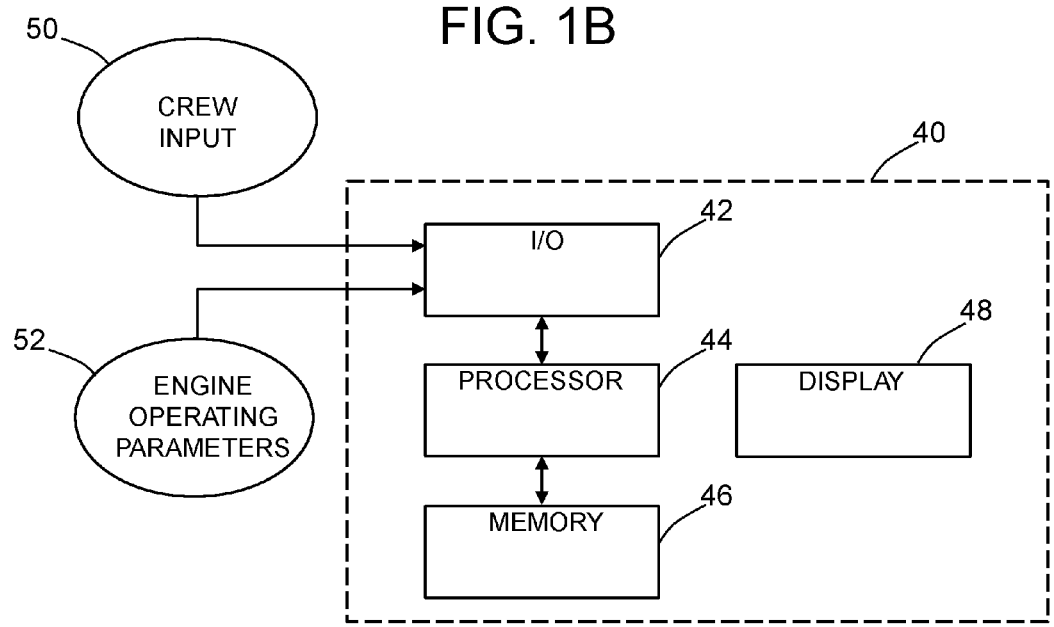
FIG. 2 is a block diagram identifying some components of a system for displaying aircraft engine information/indications.

FIG. 2 is a block diagram identifying some components of a system for displaying the state of one or more aircraft engines for viewing by a flight crew. The system comprises a computer system 12 having one or more input/output devices 14, a processor 16, a memory 18, and a display unit 20. In other embodiments, the functions carried out by the system can be distributed over a plurality of computers or processing platforms. The input/output devices 14 can receive signals corresponding to engine automation and operating parameter signals 22, and, optionally, crew input signals 24, and environmental and aircraft system sensors and inputs (not shown in FIG. 2). The processor 16 can determine the operational state of each engine, based at least in part on one or more of the engine automation or operating parameter signals 22. The processor 16 can then direct the display of an icon on the display unit 20 that qualitatively or quantitatively indicates the operational state of the engine (enabling crew awareness). The processor 16 can optionally direct the display of an icon on the display unit 20 which explicitly or implicitly indicates to the pilot whether an action is required and if so, what the action should be.

In one embodiment, the computer system 12 can be generally similar to existing avionics computers, but can be programmed and/or configured to carry out the foregoing processes. For example, the computer system 12 can include an engine controller computer (EEC or FADEC) and/or an aircraft display computer. In any of these embodiments, one or more of the input/output devices 14 can be configured to receive the engine operating parameter signals 22 directly from the aircraft engines and/or from intermediate computers or processors. One or more of the input/output devices 14 can be configured to receive the crew input signals 24 and can accordingly include a keypad, mouse pad, touch screen, switches, control levers, or other such device. The crew input signals 24 can be used to tailor certain aspects of the manner in which information is presented on the display unit 20, or to obtain additional information, without affecting the content of the information. One or more of the input/output devices 14 can also be configured to access a computer-readable medium (such as a CD, diskette or USB memory device). Directions for carrying out processes in accordance with various embodiments can be transferred from or stored on such media, and/or stored in the memory 18. The display unit 20 on which the information is presented can include a CRT screen, an LCD screen, or any other device that is configured to visually present engine-related information to the flight crew.

In a conventional manner, while the aircraft engine is operating, the processor 16 controls the display unit 20 to display a first indicator representing the calculated current fan speed N1. Typically the fan speed N1 is a normalized value (i.e., a percentage of a standard reference value). The engine idle running speed $N1_{Idle}$ is the minimum fan speed for a running engine at any given condition. The value of $N1_{Idle}$ varies as a function of altitude, airspeed, pressure, temperature and other factors such as engine make and model.

In some countries, regulations covering turbofan engine-powered aircrafts require both a tachometer (to indicate the speed of the rotors with established limiting speeds) for each engine and an indicator to indicate thrust, or a parameter that is directly related to thrust, to the pilot. The indication must be based on the direct measurement of thrust or parameters that are directly related to thrust. Some engine manufacturers have chosen to indicate thrust by a dedicated parameter such as the engine pressure ratio (EPR), separate from the N1 tachometer for fan speed (as illustrated in FIG. 1A); others have chosen to use the N1 display for both functions (as illustrated in FIG. 1B).

Figure 3A:
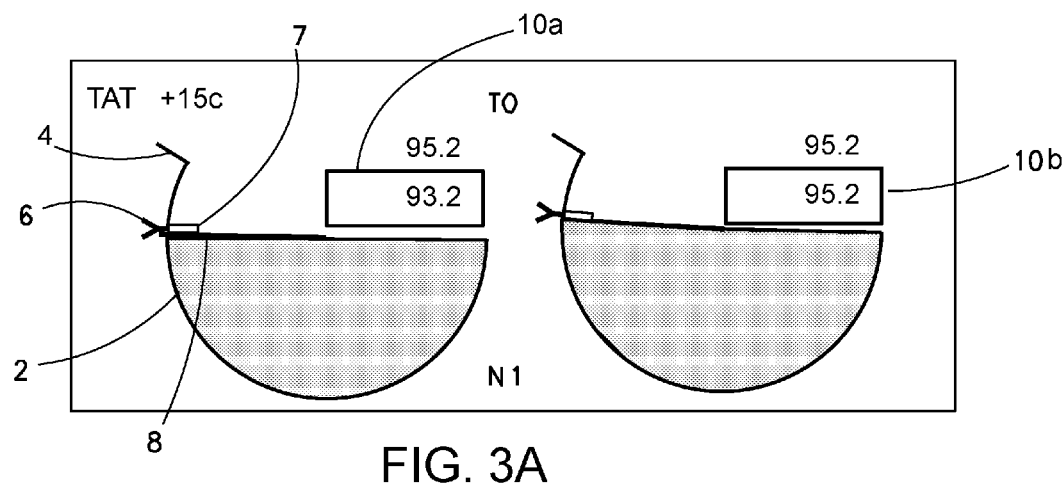
FIG. 3A is a diagram representing an N1 fan speed display for a flight deck in a situation wherein the current fan speed N1 for the left engine indicates a thrust shortfall, while the current fan speed N1 for the right engine indicates no thrust shortfall.

FIG. 3A is a diagram representing a portion of a screenshot displayed by a display unit during takeoff (TO), the content of which includes symbology representing an N1 display. The left half of the N1 display includes the following symbology for the left engine: a dial 2 representing a scale in the form of a circular arc; a tic mark 4 indicating the N1 design limit $N1_{Redline}$; a chevron 6 indicating the target fan speed $N1_{Targ}$; a tick mark 7 indicating the maximum rated fan speed $N1_{Max}$; and a needle 8 indicating the current measured fan speed N1. The right half of the N1 display includes similar symbology for the right engine.

The needle 8 is a dynamic radial line that will rotate clockwise or counterclockwise about the center of dial 2 with changes in fan speed. It should be understood that the elements displayed in FIG. 3A would be typically displayed in color. For example, dial 2 may be light gray, tic mark 4 may be red, chevron 6 may be green, tick mark 7 may be amber, and needle 8 may be white.

Still referring to FIG. 3A, numeric values (for example, 93.2 and 95.2) for the current fan speeds N1 of the left and right engines are displayed in display fields 10a and 10b respectively. These numeric values, which will change as the measured fan speed N1 changes, correspond to the respective angular positions of the needle 8. A numeric value (for example, 95.2) for the target fan speed $N1_{Targ}$ for both engines is also displayed directly above the respective display fields 10a and 10b. The display fields 10a and 10b may be represented by rectangles displayed in selected respective colors or the same selected color.

In the N1 display shown in FIG. 3A, the current and target fan speeds for the left engine indicate a thrust shortfall, while the current and target fan speeds for the right engine indicate no thrust shortfall. More specifically, the current fan speed N1 for the left engine is 93.2, whereas the target fan speed $N1_{Targ}$ is 95.2, representing a 2% N1 shortfall which corresponds to a thrust shortfall of 5.15%. This thrust shortfall is barely discernible when an observer views the dial 2 due to the small angle between chevron 6 and needle 8.

Figure 3B:
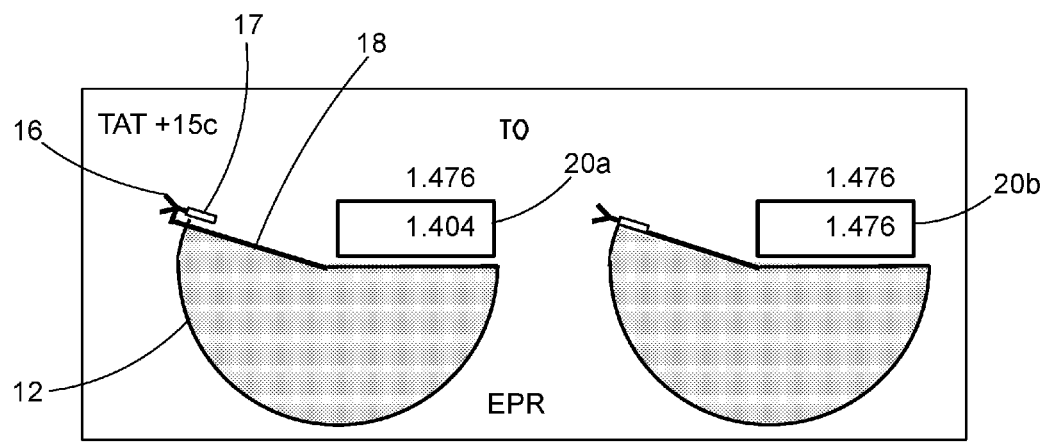
FIG. 3B is a diagram representing an EPR display for a flight deck in a situation wherein the EPR for the left engine indicates a thrust shortfall, while the EPR for the right engine indicates no thrust shortfall.

In contrast, FIG. 3B is a diagram representing a portion of a screenshot for an EPR display in which a thrust shortfall is more readily discernible. The left half of this EPR display includes the following symbology for the left engine: a dial 12 representing a scale in the form of a circular arc; a chevron 16 indicating the target EPR; a tick mark 17 indicating the maximum rated EPR, and a needle 18 indicating the current measured EPR. The right half of the EPR display includes similar symbology for the right engine. The needle 18 is a dynamic radial line that will rotate clockwise or counterclockwise about the center of dial 12 with changes in EPR. Again the elements displayed in FIG. 3B would be typically displayed in color.

Still referring to FIG. 3B, numeric values (for example, 1.404 and 1.476) for the current EPR of the left and right engines are displayed in display fields 20a and 20b respectively. These numeric values, which will change as the measured EPR changes, correspond to the respective angular positions of the needle 18. A numeric value (for example, 1.476) for the target EPR for both engines is also displayed directly above the respective display fields 20a and 20b. The display fields 20a and 20b may be represented by rectangles displayed in selected respective colors or the same selected color.

In the EPR display shown in FIG. 3B, the current and target EPRs for the left engine indicate a thrust shortfall, while the current and target EPRs for the right engine indicate no thrust shortfall. More specifically, the current EPR for the left engine is 1.404, whereas the target EPR is 1.476, which difference corresponds to a thrust shortfall of 4.75%. This thrust shortfall is readily discernible when an observer views the dial 12 due to the relatively larger angle between chevron 16 and needle 18, as compared to the relatively smaller angle between chevron 6 and needle 8 seen in FIG. 3A.

Thus, the sensitivity of the analog N1 display gauge (seen in FIG. 3A) to changes in thrust at high power is poor in comparison with the EPR display gauge (seen in FIG. 3B). This poor sensitivity at high power is attributable to one or more of the following factors: (1) the relationship of N1 versus thrust is nonlinear and shallower at the high end, (2) some gauge travel is allocated to the "unused" span from $N1_{Max}$ to the $N1_{Redline}$, and (3) some gauge travel is allocated to the span from 0 RPM to $N1_{Idle}$. As a result, the sensitivity of analog indications of thrust shortfalls for N1 gauges is less than the sensitivity for EPR gauges.

Figure 4:
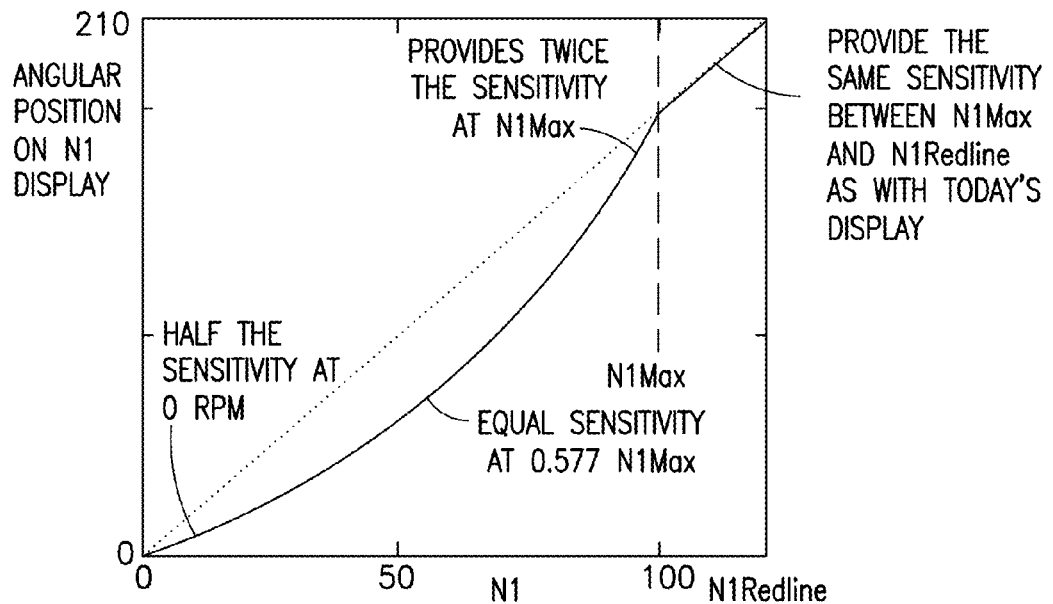
FIG. 4 is a graph of the angular position of a needle relative to a dial on an N1 display versus the current value of the fan speed N1. In this example, the maximum fan speed $N1_{Max}$ is equal to 100%.

To improve the sensitivity (i.e., increase the resolution) of an analog N1 display gauge to changes in thrust at high power, a variable scale can be employed, which improves the functionality of the N1 gauge (as a thrust gauge) in the desired region. The approach adopted herein is to leave the range from $N1_{Max}$ to the $N1_{Redline}$ unchanged, and to warp the scale from 0 RPM to $N1_{Max}$ as shown in FIG. 4. This is one possible scaling embodiment, but others are possible depending on specific behavior desired.

FIG. 4 is a graph of the angular position of a needle relative to a dial on an N1 display versus the value of N1 when the maximum rated fan speed $N1_{Max}$ equals 100%. In a typical case, the angular position of the needle has a linear relationship to N1, as indicated by the dotted straight line extending from the origin to the upper right-hand corner of the graph in FIG. 4. In accordance with one embodiment of the variable scaling concept disclosed herein, the angular position of the needle will have a nonlinear relationship to N1, as indicated by the curved solid line extending from the origin to a point of intersection with the dotted straight line in FIG. 4. This nonlinear relationship of needle angular position to N1 can be used to compensate for the nonlinear relationship between N1 and thrust to provide improved functionality of the N1 gauge as a thrust gauge in the region 0 rpm to $N1_{Max}$. In accordance with the particular scaling function depicted in FIG. 4: (1) the sensitivity of the improved N1 gauge at 0 RPM would be half of the sensitivity of an unimproved N1 gauge at 0 RPM; (2) the sensitivity of the improved N1 gauge at a fan speed of $N1_{Max}$ would be twice the sensitivity of an unimproved N1 gauge at a fan speed of $N1_{Max}$; (3) the sensitivity of the improved N1 gauge at a fan speed of $0.577 N1_{Max}$ would be equal to the sensitivity of an unimproved N1 gauge at a fan speed of $0.577 N1_{Max}$; and (4) the sensitivity of the improved N1 gauge at fan speeds above $N1_{Max}$ would be the same as the sensitivity of an unimproved N1 gauge at fan speeds above $N1_{Max}$.

Figure 4A:
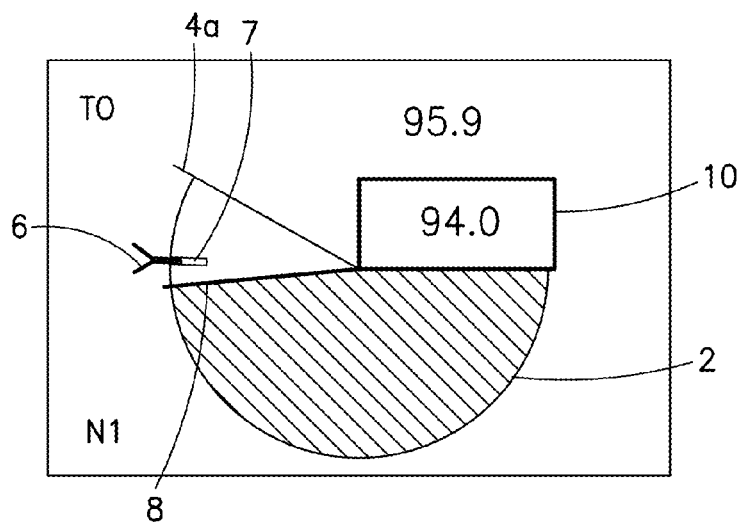
FIG. 4A is a diagram representing an N1 fan speed display in which the angular position of a needle indicating the current fan speed N1 relative to a dial is determined using the scaling function depicted in FIG. 4.

FIG. 4A is a diagram representing an N1 fan speed display in which the angular position of a needle indicating the current measured fan speed N1 relative to a dial is determined using the scaling function depicted in FIG. 4. This N1 display also includes a radial line 4a indicating the N1 design limit $N1_{Redline}$ and a tic mark 7 indicating the maximum rated fan speed $N1_{Max}$. The chevron 6 indicating $N1_{targ}$ is shown aligned with the tic mark 7 indicating $N1_{Max}$. The symbology shown in FIG. 4A further comprises a numeric value (for example, 94.0) for the current measured fan speed N1 of the engine, displayed in a display field 10; and a numeric value (for example, 95.9) for the target fan speed $N1_{targ}$ for the same engine, displayed directly above the display field 10.

In the N1 display shown in FIG. 4A, the angle between the needle 8 (indicating the current fan speed N1) and the chevron 6 (indicating the target fan speed $N1_{targ}$) indicates a thrust shortfall. This thrust shortfall is readily discernible when an observer views the dial 2 due to the relatively large angle between chevron 6 and needle 8 as compared to the angle between chevron 6 and needle 8 seen in FIG. 3A.

It should be appreciated that N1 gauges proposed herein may have scaling functions other than the specific scaling function depicted in FIG. 4. For example, the scaling function can be any one of a multiplicity of different polynomial functions. The display processor may be configured to convert incoming N1 measurements into corresponding angular positions of the needle on an N1 gauge by computing a function or by reading a look-up table storing pre-computed angular positions.

The variable display scaling disclosed herein can be configured differently based on the preferences or requests of different customers who may have specific operational needs. Therefore the method for displaying the fan speed N1 for use as a thrust gauge is much more useful to the manufacturer, as it can easily be reconfigured, and is much more useful to the airline, as it can address specific operational needs.

The maximum rated fan speed $N1_{Max}$ will vary as a function of the thrust rating for a particular engine. The effect of changing $N1_{Max}$ on the nonlinear scaling function scaling is that the intersection point with a linear function at $N1_{Max}$ will move. In accordance with the particular scaling function shown in FIG. 5, for any $N1_{Max}$, the sensitivity at 0 RPM is always half the linear slope, and the sensitivity rises to twice the linear slope at $N1_{Max}$, and then is linear up to $N1_{Redline}$. This is shown in FIG. 5 for various $N1_{Max}$ values.

Figure 5:
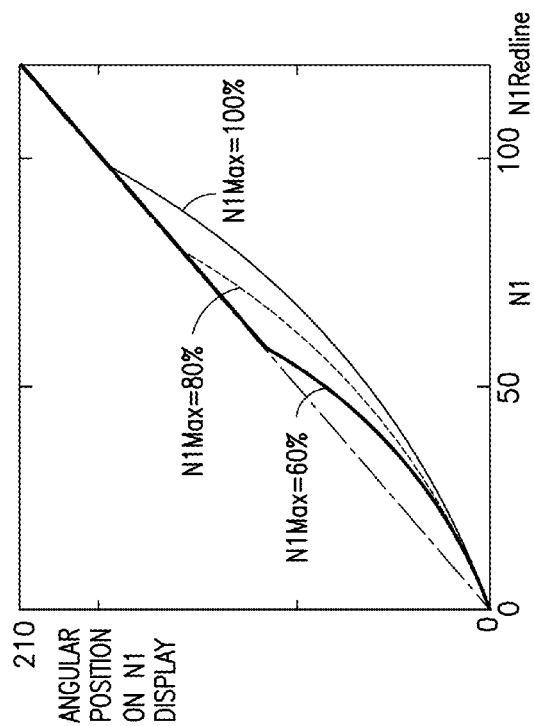
FIG. 5 is a graph of the angular position of a needle relative to a dial on an N1 display versus the current value of the fan speed N1 for different maximum fan speeds.

FIG. 5 is a graph of respective curves correlating the angular position of a needle 8 on the N1 display versus the current value of the fan speed N1 for maximum fan speeds (N1max) equal to 60%, 80% and 100%.

Figure 5B:
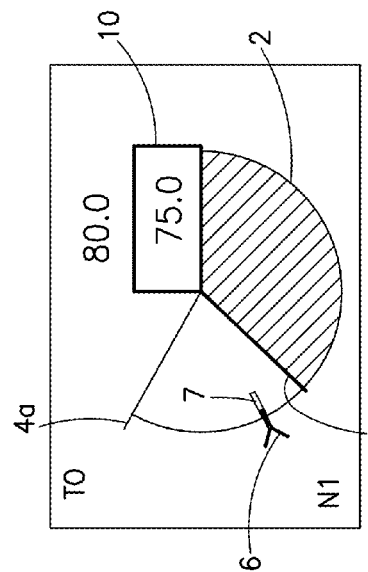
FIG. 5B is a diagram representing an N1 fan speed display in which the angular position of a needle indicating the current fan speed N1 relative to a dial is determined using a scaling function (indicated by a dashed curve in FIG. 5) corresponding to a maximum fan speed $N1_{Max}$ equal to 80%.
Figure 5A:
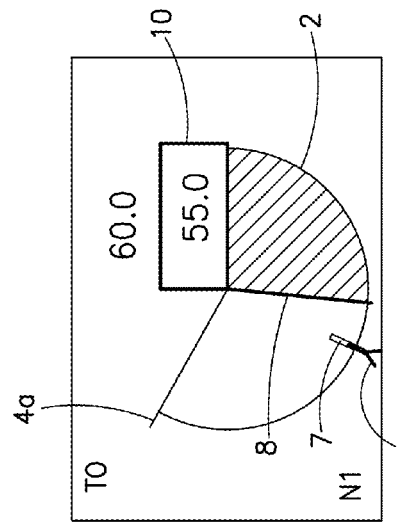
FIG. 5A is a diagram representing an N1 fan speed display in which the angular position of a needle indicating the current fan speed N1 relative to a dial is determined using a scaling function (indicated by a solid curve in FIG. 5) corresponding to a maximum fan speed $N1_{Max}$ equal to 100%.

FIG. 5A shows an N1 fan speed display in which the angular position of a needle 8 indicating the current fan speed N1 relative to a dial 2 is determined using a scaling function (indicated by a solid curve in FIG. 5) corresponding to a maximum fan speed $N1_{Max}$ equal to 100%.

FIG. 5B shows an N1 fan speed display in which the angular position of a needle 8 indicating the current fan speed N1 relative to a dial 2 is determined using a scaling function (indicated by a dashed curve in FIG. 5) corresponding to a maximum fan speed $N1_{Max}$ equal to 80%.

Figure 5C:
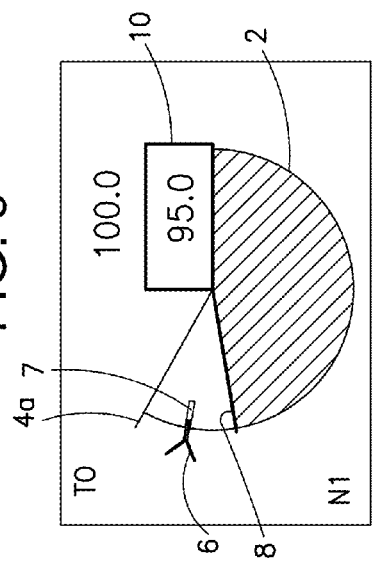
FIG. 5C is a diagram representing an N1 fan speed display in which the angular position of a needle indicating the current fan speed N1 relative to a dial is determined using a scaling function (indicated by a bold curve in FIG. 5) corresponding to a maximum fan speed $N1_{Max}$ equal to 60%.

FIG. 5C shows an N1 fan speed display in which the angular position of a needle 8 indicating the current fan speed N1 relative to a dial 2 is determined using a scaling function (indicated by a bold curve in FIG. 5) corresponding to a maximum fan speed $N1_{Max}$ equal to 60%.

The N1 gauge proposed herein is configurable for multiple $N1_{Max}$ values because $N1_{Max}$ will vary as a function of altitude, temperature, and rating. The goal of increasing resolution of the N1 gauge near $N1_{Max}$ is still retained regardless of the actual value of $N1_{Max}$.

The effect of using a nonlinear scaling function as disclosed above is to increase display resolution in the upper region of the operating range during takeoff (i.e., the range from $N1_{Idle}$ to $N1_{Max}$). This effect can be visualized by comparing FIG. 7 to FIG. 6.

Figure 6:
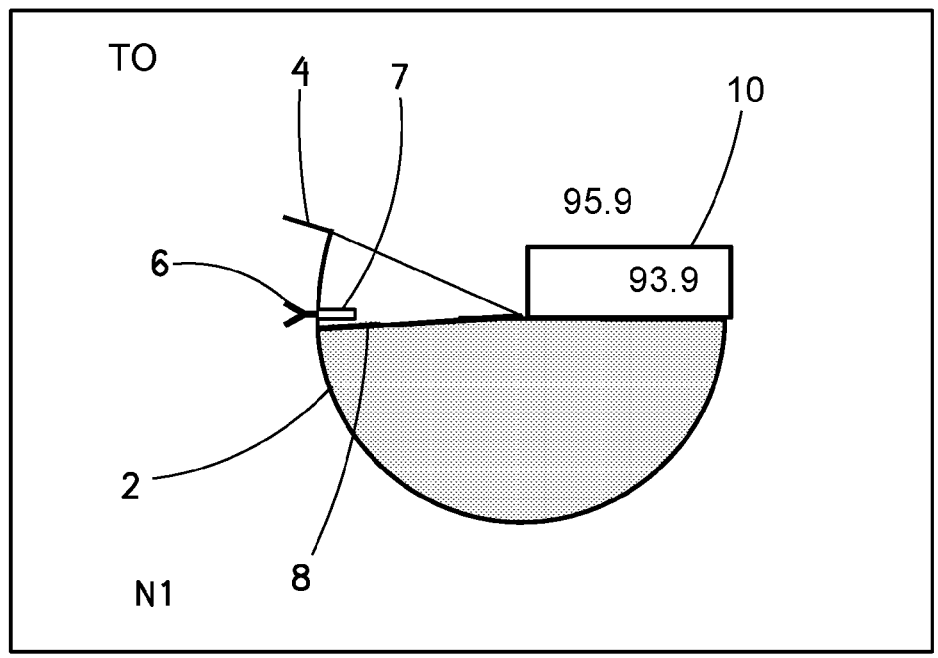
FIG. 6 is a diagram representing an N1 fan speed display in which the angular position of a needle indicating the current fan speed N1 during takeoff relative to a dial is determined using a linear scaling function.

FIG. 6 shows an N1 fan speed display in which the angular position of a needle 8 indicating the current fan speed N1 during takeoff relative to a dial 2 is determined using a linear scaling function. In this example, the target fan speed $N1_{Targ}$ is 95.9% while the current fan speed N1 is 93.9%, meaning that the intended thrust (and the intended fan speed that is being used as a surrogate for thrust) has been set too low by pilot command or by a computer. In this example, the fan speed N1 has been set 2% short of the intended value $N1_{Targ}$. This 2% short set is indicated by the small angle (i.e., a few degrees) between the chevron 6 and needle 8 in FIG. 6. This small angle can be difficult for the pilot to discern.

Figure 7:
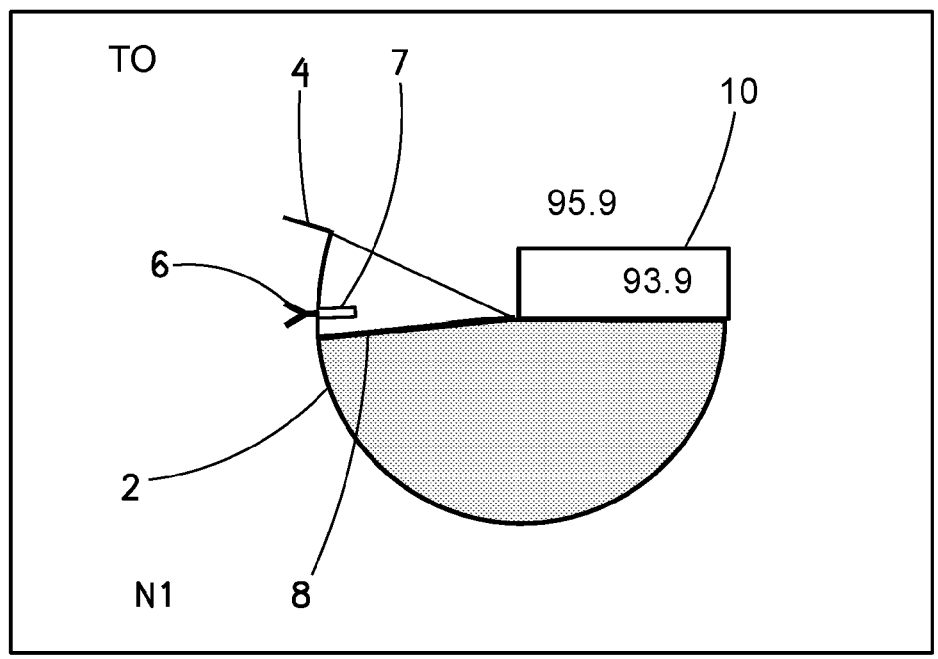
FIG. 7 is a diagram representing an N1 fan speed display in which the angular position of a needle indicating the current fan speed N1 during takeoff relative to a dial is determined using a nonlinear scaling function.

In contrast, FIG. 7 shows an N1 fan speed display in which the angular position of a needle 8 indicating the current fan speed N1 during takeoff relative to a dial 2 is determined using a nonlinear scaling function. The target fan speed $N1_{Targ}$ and the current fan speed N1 are the same as in FIG. 6. However, because the scaling function is nonlinear, this 2% short set is indicated by a larger angle between the chevron 6 and needle 8 in FIG. 7. This larger angle is easier for the pilot to discern.

In addition, as previously mentioned, some gauge (i.e., needle) travel must be allocated to the span from 0 rpm to the idle fan speed $N1_{Idle}$. The use of a nonlinear scaling function as disclosed herein has the beneficial effect of reducing the amount of dial space allocated to the region below the idle fan speed $N1_{Idle}$. This effect can be visualized by comparing FIG. 9 to FIG. 8.

Figure 8:
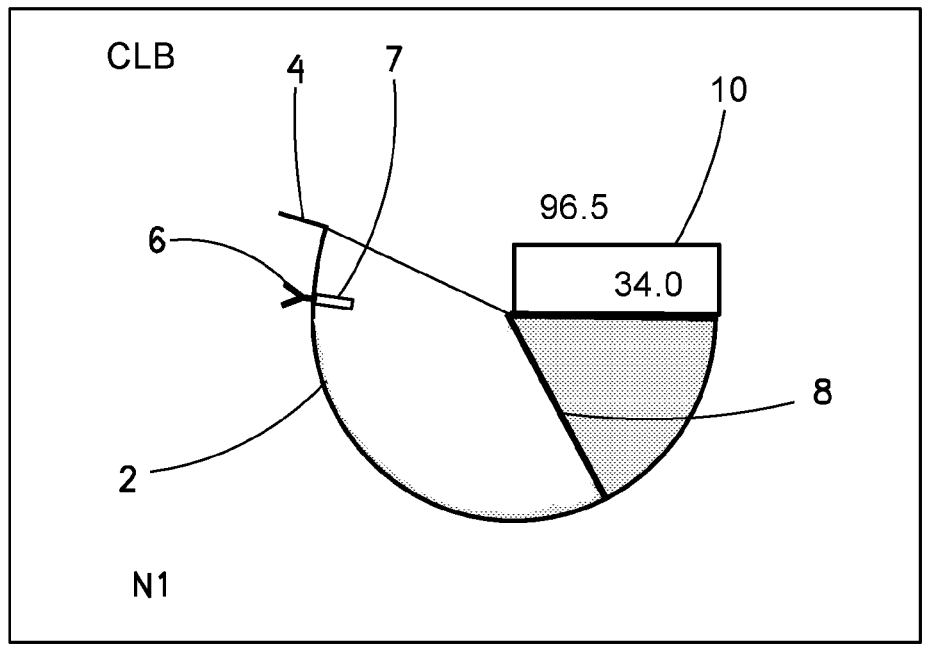
FIG. 8 is a diagram representing an N1 fan speed display in which the angular position of a needle indicating a current fan speed N1 equal to the idle fan speed $N1_{Idle}$ relative to a dial is determined using a linear scaling function while the aircraft is flying at an altitude of 25,000 feet.

FIG. 8 shows an N1 fan speed display in which the angular position of the needle 8 indicating a current fan speed N1 equal to the idle fan speed $N1_{Idle}$ relative to the dial 2 is determined using a linear scaling function while the aircraft is flying at an altitude of 25,000 feet. In this example, the target fan speed $N1_{targ}$ (and $N1_{max}$ incidentally) is 96.5 while the idle fan speed $N1_{Idle}$ is 34.0, meaning that about 35% of the portion of the dial 2 from 0 rpm to $N1_{Targ}$ is occupied by the region below $N1_{Idle}$.

Figure 9:
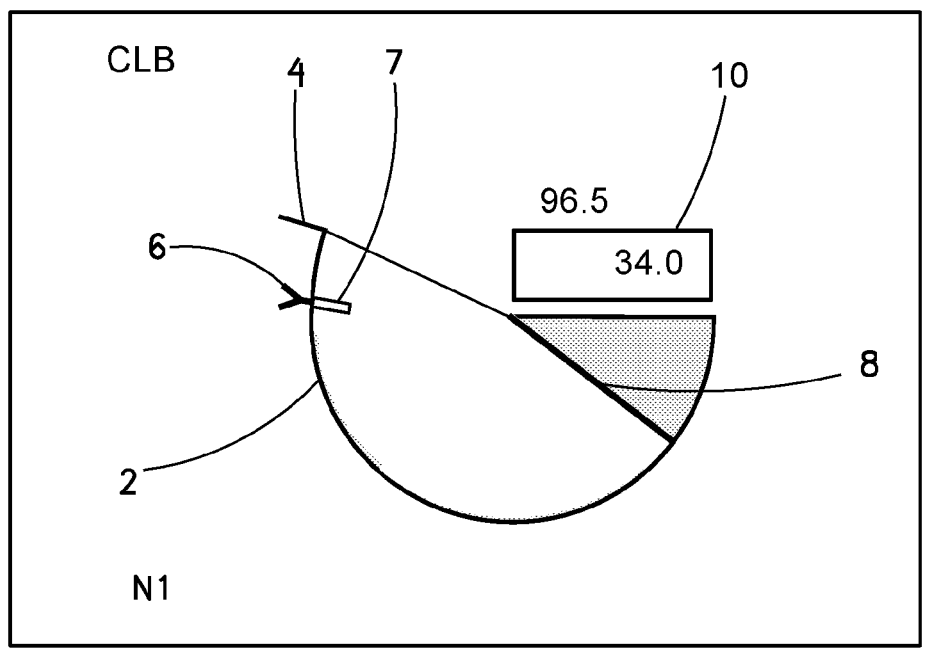
FIG. 9 is a diagram representing an N1 fan speed display in which the angular position of a needle indicating a current fan speed N1 equal to the idle fan speed $N1_{Idle}$ relative to a dial is determined using a nonlinear scaling function while the aircraft is flying at an altitude of 25,000 feet.

In contrast, FIG. 9 shows an N1 fan speed display in which the angular position of the needle 8 indicating a current fan speed N1 equal to the idle fan speed $N1_{Idle}$ relative to the dial 2 is determined using a nonlinear scaling function while the aircraft is flying at the same altitude of 25,000 feet. In this case, the portion of the dial 2 from 0 rpm to $N1_{Targ}$ which is occupied by the region below $N1_{Idle}$ is much less than 35%, i.e., the below idle region consumes less dial space.

A further feature of the systems and methods for displaying N1 fan speed disclosed herein is a visual indication to provide pilots the ability to discern if the current thrust is within a specified tolerance of the desired value within the takeoff region (for example, during a rolling takeoff). This additional indication is based on color changes associated with the N1 display.

On some aircraft, the analog indication of N1 is used by the pilots to make the thrust set call (a.k.a. power check callout) at or before 80 knots to ensure that all engines have reached the rating limit. The takeoff may be aborted if the takeoff thrust setting is lower than the desired takeoff thrust setting by more than a specified tolerance. In cases where the N1 gauge is being used as a thrust gauge, the takeoff will not be aborted if the current fan speed N1 is less than the maximum fan speed $N1_{Max}$ by less than a specified percentage (e.g., 0.5% or 1%). Poor analog dial resolution combined with the environmental conditions (e.g., vibration of the aircraft at 80 knots) can make the power check callout difficult to accomplish.

It would be beneficial during takeoff to provide the pilot with a discrete cue that the thrust has been set to a takeoff thrust value that is within a specified tolerance of the desired takeoff thrust value. This should be in addition to the existing analog display and only an additional source of information. It should be consistent with the thrust setting parameter display.

Figure 10A:
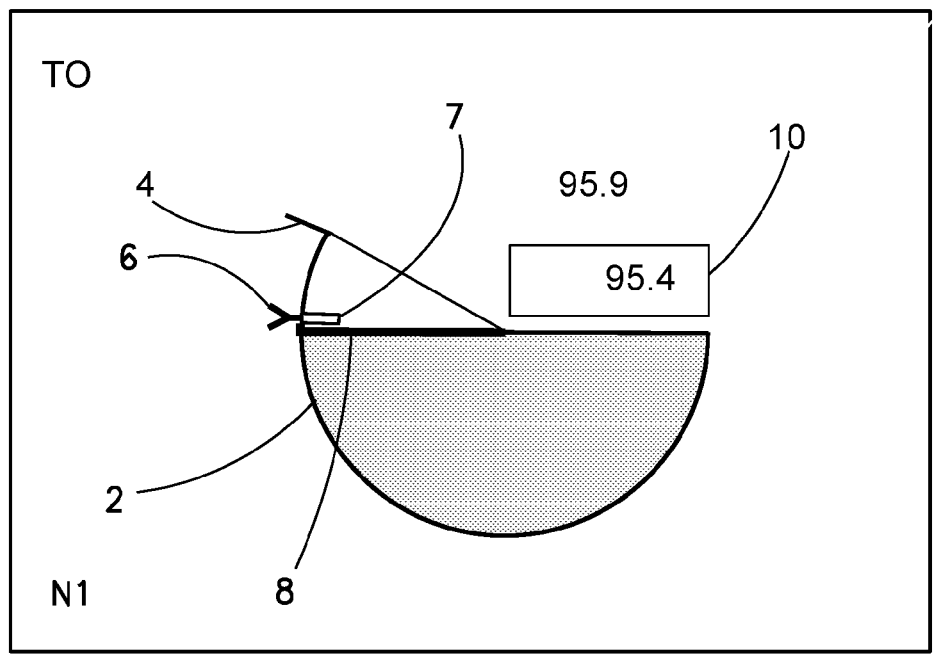
FIGS. 10A and 10B are diagrams representing an N1 fan speed display in which a symbol changes color when the current fan speed N1 changes from being less than a target fan speed $N1_{Targ}$ by more than a specified percentage to being less than $N1_{Targ}$ by less than the specified percentage.
Figure 10B:
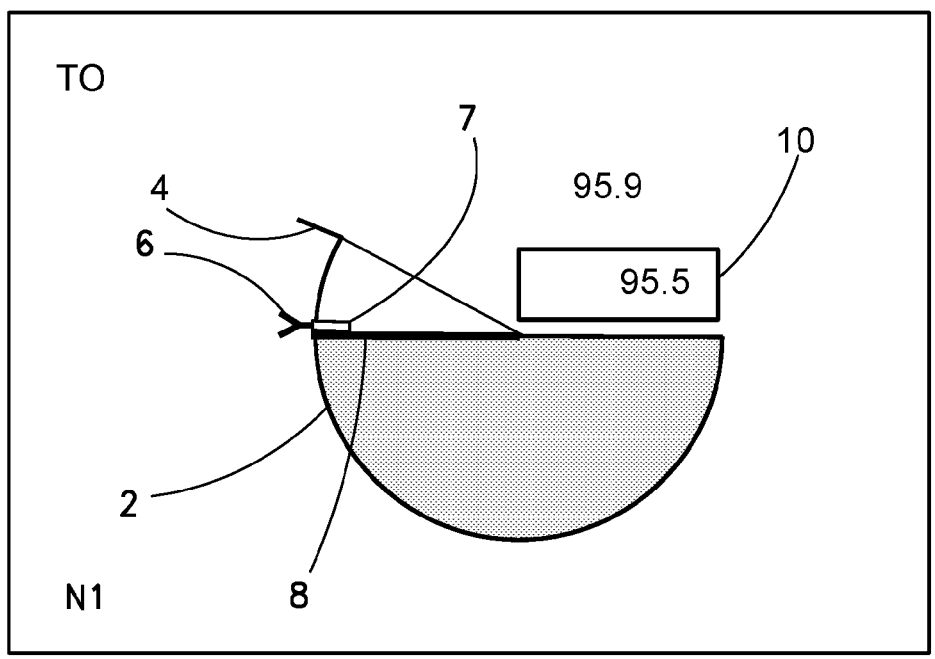
Figure 2:
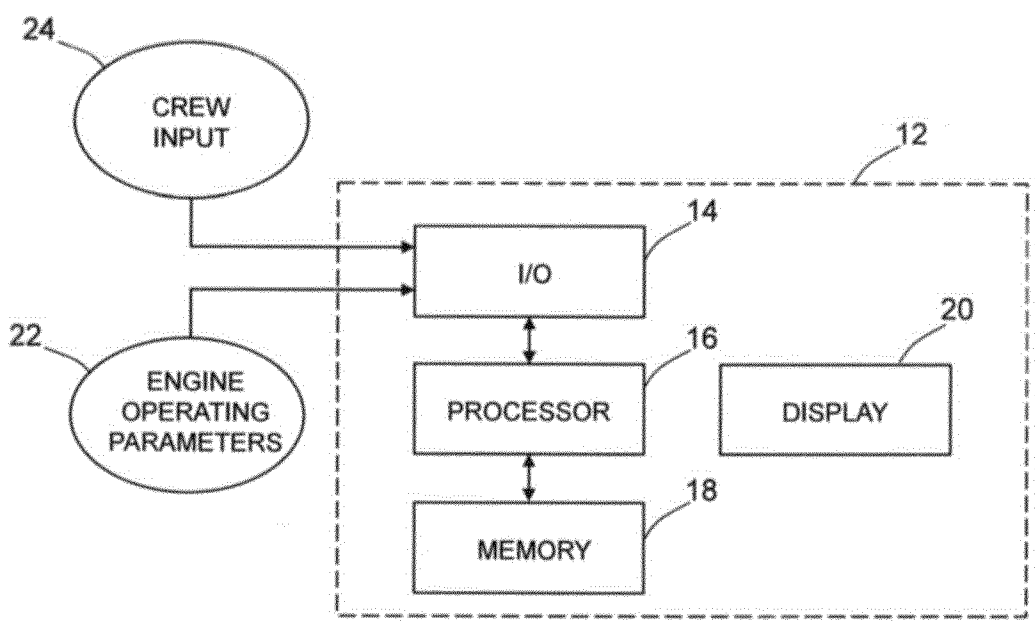

FIGS. 10A and 10B are diagrams representing an N1 fan speed display in which a symbol changes color (for example, from white to green) when the current fan speed N1 changes from being less than a target fan speed $N1_{Targ}$ by more than a specified percentage to being less than $N1_{Targ}$ by less than the specified percentage. In the example depicted in FIGS. 10A and 10B, the allowable error is 0.5% $N1_{Targ}$.

More specifically, FIG. 10A shows an N1 fan speed display in which the angular position of a needle indicating the current fan speed N1 relative to a dial is determined using a nonlinear scaling function in a situation wherein the current fan speed N1 is less than a target fan speed $N1_{Targ}$ (indicate by chevron 6) by more than the allowable error 0.5%. This N1 display also includes a radial line 4 indicating the design limit $N1_{Redline}$. The symbology shown in FIG. 10A further comprises: a numeric value 95.4 for the current fan speed N1 of the engine, displayed in a display field 10 having a first color; and a numeric value (for example, 95.9) for the target fan speed $N1_{targ}$ for the same engine, displayed directly above the display field 10.

In contrast, FIG. 10B shows the same N1 fan speed display in a situation wherein the current N1 is less than $N1_{targ}$ within the allowable error 0.5%. In response to a change in fan speed N1 from less than 95.5% $N1_{targ}$ to greater than or equal to 95.5% $N1_{targ}$, the color of the display field 10 has changed from the first color (e.g., white) to a second color (e.g., green) different than the first color. The different colors are represented by slightly different shading of the display field 10 in FIGS. 10A and 10B. This change in color indicates to the pilot that the actual thrust is within a defined error of the desired takeoff thrust, i.e., that the proper takeoff thrust level has been properly set.

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

Many embodiments of the system described above may take the form of computer-executable instructions, such as routines executed by a programmable computer. Those skilled in the relevant art will appreciate that the N1 display scheme disclosed herein can be practiced on other computer system configurations as well. The computer system can be embodied in a special-purpose computer or data processor that is specifically programmed, configured or constructed to perform one or more of the computer-executable instructions described herein. Accordingly, the term "computer" as generally used herein includes any processor and can include Internet appliances, hand-held devices (including palm-top computers, wearable computers, cellular or mobile phones, multiprocessor systems, processor-based or programmable consumer electronics, mini-computers and the like).

The N1 display scheme disclosed herein can also be practiced in distributed computing environments, where tasks or modules are performed by remote processing devices that are linked through a communications network. In a distributed computing environment, program modules or subroutines may be located in both local and remote memory storage devices. Aspects of the system described above may be stored or distributed on computer-readable media, including magnetic or optically readable computer disks (e.g., removable disks), as well as distributed electronically over networks. Data structures and transmissions of data particular to aspects of the disclosed system are also encompassed within the scope of the claims appended hereto. Furthermore, the N1 gauges disclosed herein can be presented on displays or display media, for example, CRT screens, LCD screens or other suitable devices.

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. An aircraft comprising: an aircraft engine having a fan; a sensor configured to generate fan speed data representing a measurement of a fan speed of the fan; a display unit that can be controlled electronically to generate symbology and colors; and a display control processor configured to perform the following operations: receiving fan speed data generated by the sensor; and controlling the display unit to display a scale having a first end representing 0 rpm and a second end representing a fan speed design limit and to display first and second symbology having respective positions relative to the scale, the position of the first symbology relative to the scale representing a maximum rated fan speed and the position of the second symbology relative to the scale representing a current measured fan speed, wherein when the second symbology is located between the first symbology and the second end of the scale, the position of the second symbology is determined using a linear scaling function of a current fan speed, and when the second symbology is located between the first symbology and the first end of the scale, the position of the second symbology is determined using a nonlinear scaling function of the current fan speed.

2. The aircraft as recited in claim 1, wherein the display control processor is further configured to control the display unit to display a discrete cue that thrust has been set to a takeoff thrust value that is within a specified tolerance of a desired takeoff thrust value.

3. An aircraft comprising: an aircraft engine having a fan; a sensor configured to generate fan speed data representing a measurement of a fan speed of the fan; a display unit that can be controlled electronically to generate symbology and colors; and a display control processor configured to control the display unit to generate indicators indicating a current value of a fan speed of an operating engine of the aircraft, wherein the display control processor is configured to perform the following operations: (a) converting incoming values of the fan speed which are less than a maximum rated fan speed into corresponding angular positions of first symbology to be displayed relative to a scale by the display unit using a nonlinear scaling function of the fan speed that characterizes a nonlinear relationship between the fan speed and thrust of an aircraft engine; (b) converting incoming values of the fan speed which are greater than the maximum rated fan speed into corresponding angular positions of the first symbology to be displayed relative to a scale by the display unit using a linear scaling function of the fan speed; (c) receiving a current value of the fan speed during operation of an engine of the aircraft; (d) controlling the display unit to display the scale having a first portion that ends at a first end representing 0 rpm and a second portion that ends at a second end representing a fan speed design limit; and (e) controlling the display unit to display the first symbology having a position relative to the first portion of the scale that is determined by the nonlinear scaling function when the current value of the fan speed is less than the maximum rated fan speed and having a position relative to the second portion of the scale that is determined by the linear scaling function when the current value of the fan speed is greater than the maximum rated fan speed, the angular position of the displayed first symbology relative to the displayed scale representing the current value of the fan speed.

4. The aircraft as recited in claim 3, wherein the nonlinear scaling function is a polynomial function.

5. The aircraft as recited in claim 3, further comprising a non-transitory tangible computer-readable storage medium having a look-up table stored therein, wherein the lookup table comprises fan speed values and corresponding symbology positions of the first symbology relative to the scale, and the display control processor is further configured to retrieve the position of the first symbology relative to the scale from the lookup table.

6. The aircraft as recited in claim 3, wherein the scale is a circular arc and the first symbology is a radial line originating at a center of and intersecting the circular arc at an angular position.

7. The aircraft as recited in claim 6, further comprising a non-transitory tangible computer-readable storage medium having a look-up table stored therein, wherein the lookup table comprises fan speed values and corresponding symbology positions of the radial line relative to the scale, and the display control processor is further configured to retrieve the angular position of the radial line relative to the circular arc from a lookup table.

8. The aircraft as recited in claim 3, wherein the display control processor is further configured to control the display unit to display a discrete cue that thrust of the engine has been set to a takeoff thrust value that is within a specified tolerance of a desired takeoff thrust value.

9. The aircraft as recited in claim 1, wherein the nonlinear scaling function characterizes a nonlinear relationship between the fan speed and thrust of an aircraft engine, and wherein the display control processor is further configured to control the display unit to display third symbology, the position of the third symbology relative to the scale representing a target fan speed and the angle between the first and third symbology indicating a thrust shortfall.

10. The aircraft as recited in claim 8, wherein the display control processor is further configured to control the display unit to display second symbology, wherein the discrete cue comprises a change in color of the second symbology.

11. The aircraft as recited in claim 10, wherein the second symbology comprises a rectangle, and the display control processor is further configured to control the display unit to display a numeric value inside the rectangle, the numeric value being a current value of a fan speed.

12. The aircraft as recited in claim 3, wherein the display control processor is further configured to control the display unit to display second symbology that indicates where the first and second portions of the scale meet, wherein the position of the second symbology relative to the scale represents a maximum rated fan speed.

* * * * *

UNITED STATES PATENT AND TRADEMARK OFFICE
CERTIFICATE OF CORRECTION

PATENT NO. : 9,950,805 B2
APPLICATION NO. : 14/922395
DATED : April 24, 2018
INVENTOR(S) : Christopher M. Hodges and Kevin S. Brown It is certified that error appears in the above-identified patent and that said Letters Patent is hereby corrected as shown below:

In the Drawings

Delete FIG. 2 on Sheet 2 and substitute FIG. 2 as shown on the attached page.

Signed and Sealed this
Fourth Day of February, 2020

Andrei Iancu
*Director of the United States Patent and Trademark Office*